Jan. 14, 1975 S. B. BLODGETT Re. 28,303

DYNAMICALLY COMPENSATED WEIGHING SCALES

Original Filed June 15, 1962 4 Sheets-Sheet 1

DYNAMICALLY COMPENSATED WEIGHING SCALES

Original Filed June 15, 1962 4 Sheets-Sheet 2

DYNAMICALLY COMPENSATED WEIGHING SCALES

Original Filed June 15, 1962 4 Sheets-Sheet 3

United States Patent Office

Re. 28,303
Reissued Jan. 14, 1975

28,303
DYNAMICALLY COMPENSATED WEIGHING SCALES

Stewart B. Blodgett, Houston, Tex., assignor to Blodgett Manufacturing Company, a division of Mira-Pak, Inc.

Original No. 3,142,349, dated July 28, 1964, Ser. No. 202,884, June 15, 1962. Application for reissue May 23, 1973, Ser. No. 363,146
Int. Cl. G01g 23/14
U.S. Cl. 177—164 26 Claims

Matter enclosed in heavy brackets [ ] appears in the original patent but forms no part of this reissue specification; matter printed in italics indicates the additions made by reissue.

The present invention provides a method and apparatus for increasing the accuracy of scales used for rapid repetitive weighing by compensating for effects of transient loading such as those derived from impact of solid articles being weighed or the vibration of the scale as a whole or, alternatively, for the weight of material still entering the weighing pan when the desired weight is indicated. My invention provides a novel, useful weighing device wherein these compensations are attained by coupling a compensating system to the weighing scale by means responsive to vibration and impact loading or responsive to the rate of feed of the material to the weighing scale and connecting the outputs of the compensating system and weighing scale to effect compensation in the resultant scale reading.

In the packaging industry, the product is frequently weighed while it is being fed to the scale in order to control the weight of the finished package. When conventional scales are used at practical filling speeds, there are a number of factors which affect the accuracy of the package weight. In certain applications where material is being fed to a scale pan the cut off valve is located a finite distance from the scale pan and hence there may be material in the air past the cut off valve when the valve is closed at the time the cut off weight is indicated on the weighing scale. Compensation must be made for the weight of this material in the air to reduce variations in the weight of the packages. If there is variation in material density or in the feed rate at which material is entering the scale, loss of accuracy may result. In a different utilization, the initial loading due to the impact of solid objects being weighed on the scale pan may be the primary source of error. For items such as hard candy or dog biscuits, this effect may be more important than the weight of the column of material in the air. In still another case, packages may be transported to the pan of the scale from a movable belt resting on the pan. For example, a belt might be used to transport and permit weighing of filled packages for the purpose of rejecting packages falling outside of a certain weight tolerance or to cause corrective action to be taken at the filling machine. When conventional scales are used, accuracy may be affected by belt vibration, belt flutter, or other irregularities. In larger scales, a complete conveyor drive may be mounted on the scale platform. Here the vibration of the platform from the motor and drive mechanism, as well as vibration from the floor will affect accuracy. Whatever the manner of loading the pan of the scale, all weighing instruments will suffer from vibration of the scale mount as a whole due to floor movement or other unavoidable vibrations of the building.

Obviously, vibration compensation could be achieved by providing two similar scales which will respond to vibration similarly and by [the] coupling the outputs of these scales so that they tend to subtract in order to nullify the effects of vibration. However, upon varying the weight on one scale, the response to vibration of that scale will be altered so that the output of the two scales will not necessarily nullify the effects of vibration and may, in fact, tend to increase such effects, since the outputs of the scales are not in phase and the signals will not tend to cancel each other. Thus, such a system of vibration compensation is not effective since it achieves the desired objective only at one specific scale loading.

According to one embodiment of the invention first and second scale means are interconnected by a coupling which causes substantially equal response in the second or compensating scale means to movements of the scale pan of the first scale means of a higher velocity than that experienced by normal feed rates. Thus, both said first and second scale means respond substantially equally to vibrations regardless of the loading on the scale pan. By interconnecting the signals of the first and second scale means so that the resultant output reflects the difference between these signals, vibration compensation at any loading is achieved. In this mode of operation of the invention, compensation for impact loading of the scale will also be achieved since such impact loading creates movements of the scale pan of greater than the velocity experienced by normal feed rates so as to cause the second or compensating scale means to respond. While the compensating system is referred to herein as a second scale means it is recognized that this compensating system is not used for weighing although its construction is generally similar to a scale and it is used for measuring deflection and force.

In another embodiment of the invention the coupling between the first and second scale means is adjusted so that a response will be produced in the second or compensating scale means to substantially any weight change in the first scale means scale pan, this response in the compensating means being proportional to the feed rate on the scale pan. In this embodiment the signals from the first and second scale means are coupled so that the resultant is the sum of the two signals. As pointed out hereinbefore in certain applications of the presently disclosed weighing system it is desirable to anticipate the material which is past the cut off valve and in the air on the way to the scale pan. Obviously, if the amount of material in the air is not taken into account, when the scale indicates cut off and the cut off valve is closed, such variations in the additional material will cause variations in the weight of the packages. By connecting the first and second scale means so that the compensating means produces a signal proportional to the rate of feed to the first scale means and by adding the outputs, the resultant is a value greater than the output of the first scale means and when cut off occurs the material in the air will be taken into account. In this embodiment the system, in effect, predicts the amount of material to be fed on the basis of the rate at which material has been fed in the immediately preceding instant.

An object of my invention is to provide a simple, rugged, compact, reliable balance system providing highly effective compensation for vibrations introduced on the pan or in the base structure.

Another object of my invention is to provide means to compensate for impact loading of articles forcibly striking the scale pan.

Still another object of my invention is to provide the above noted suspensions with a rate sensitive intercoupling whereby a rate proportional signal is provided in the output of the secondary or compensating suspension which will be proportional to material that continues to be added to the scale after the cut-off signal.

Another object of my invention is to permit either the sum or the difference of the outputs of the scale means and compensating means to be measured as an output.

That these and other objects are readily derived from the practice of my invention will be seen from subsequent detailed description when taken together with the appended drawings, in which.

Figure 6:
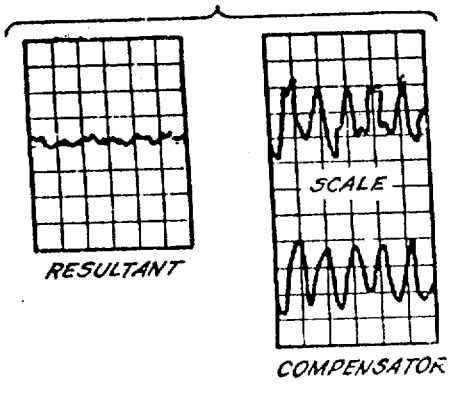
Figure 7:
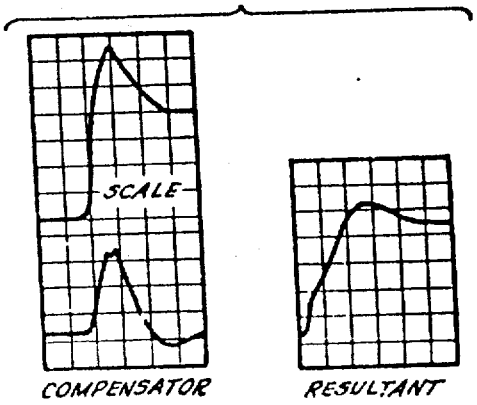
Figure 8:
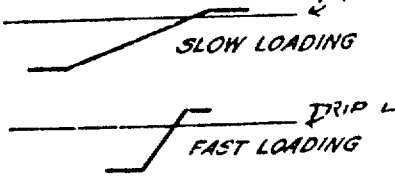
Figure 9:
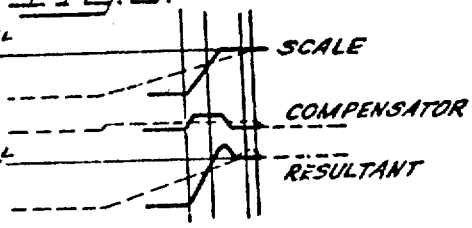
Figure 2:
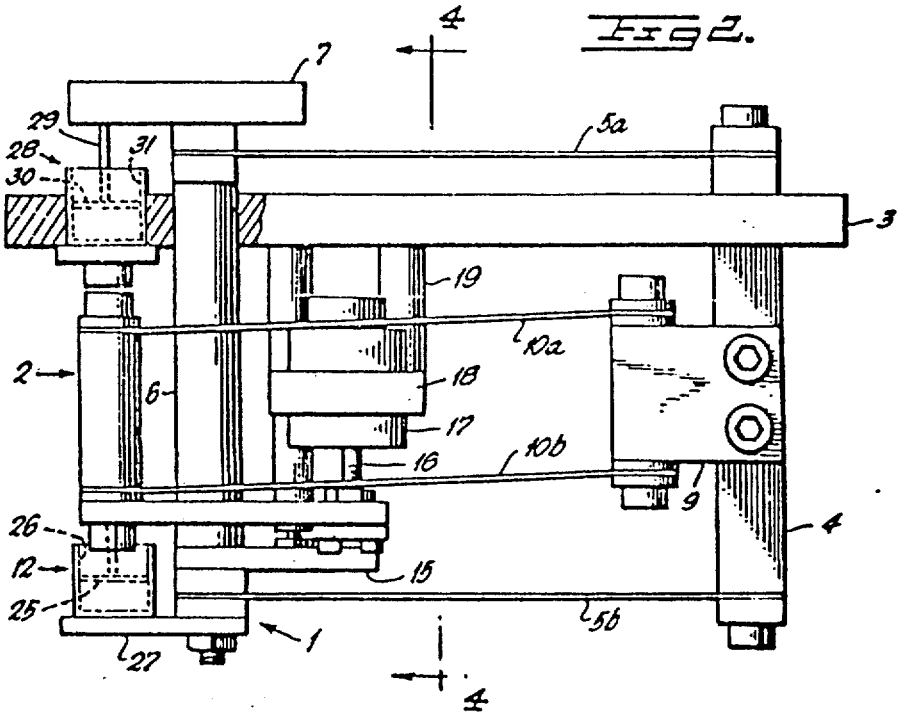
FIG. 2 shows a side elevation view of a preferred embodiment of my invention showing a practical arrangement of suspension elements, intercoupling dampers and recording transducers.
Figure 5:
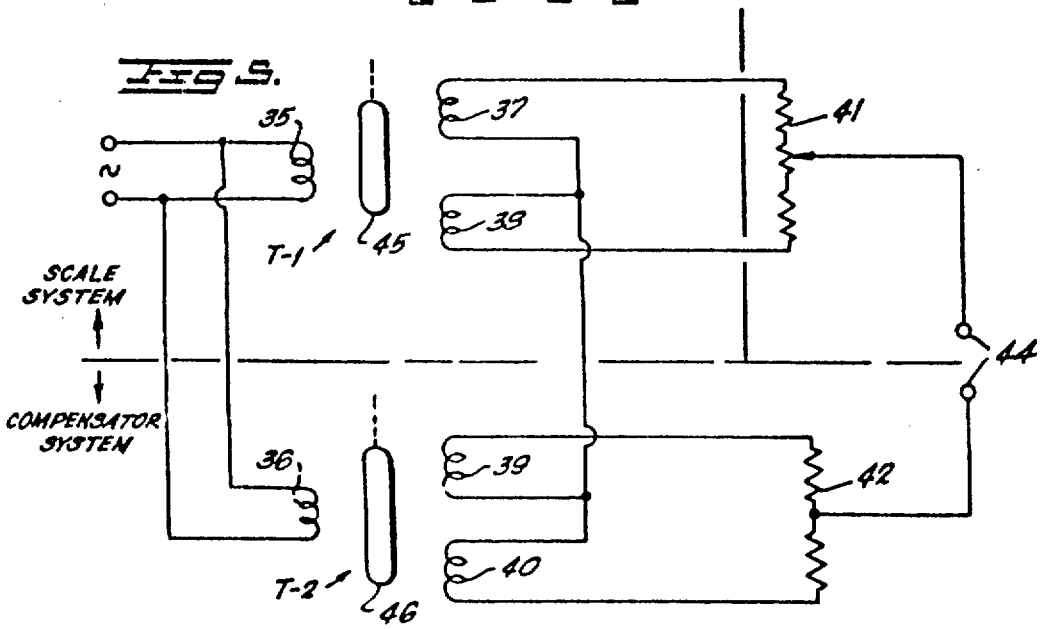
Figure 10:
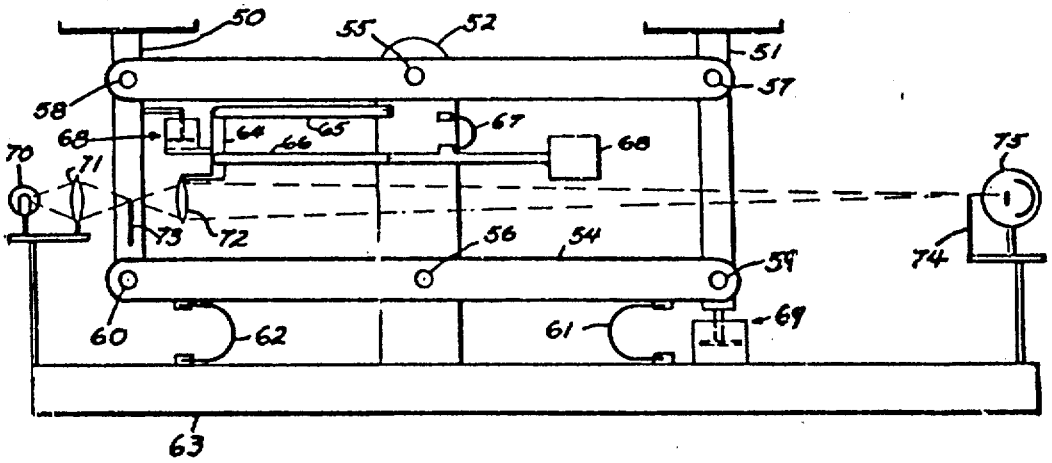
Figure 11:
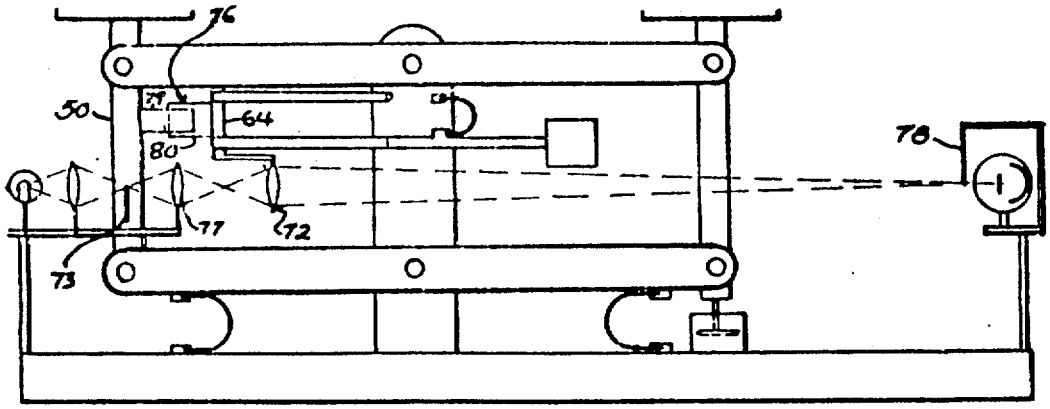

FIG. 5 provides an example of suitable circuit connections for the differential transformer displacement transducers;

FIGS. 6–9 show some actual records of signals derived from various loading and vibration conditions on the preferred embodiment of FIG. 2, of which;

FIG. 6 shows the way in which vibrations of the base may be reduced in the output signal;

FIG. 7 shows the compensation for the impact loading of hard articles striking the scale;

FIG. 8 shows schematically the problem involved in prior art devices in compensating for weight of material in the air;

FIG. 9 shows the way in which the present invention provides compensation for this effect;

FIG. 10 shows an alternative balance structure wherein a pan balance suspension replaces the spring suspension and a photoelectric transducer provides means for subtracting the relative displacements of scale and compensating suspensions; and FIG. 11 shows a balance structure as in FIG. 10 but with a photoelectric transducer which provides means for adding the relative displacement of scale and compensating suspensions and a magnetic intercoupling means.

Figure 1:
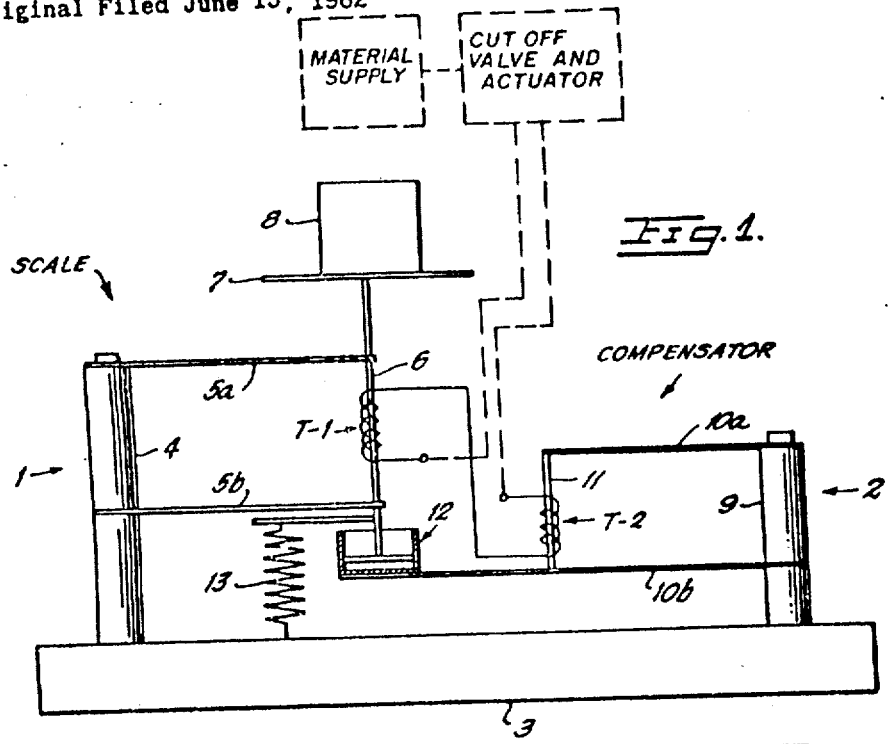
FIG. 1 shows a schematic diagram of the system showing both the scale and compensating suspension and rate proportional intercoupling.

Essential components of a system utilizing the teaching of my invention are shown in FIG. 1. Here a scale suspension designated generally by reference character 1 is mounted on a base 3 along with a somewhat corresponding compensator suspension designated as 2. The scale suspension is supported on a pillar member 4 which provides attachment for flexure plates 5a and 5b clamped apart at the other end by scale stem 6. The resilient restoring force inherent in flexure plates 5 may be augmented by another spring, here shown as helical spring 13. In this way, application of load in receptacle 8 placed atop pan 7 will cause a linearly proportional downward displacement of scale stem 6. The similarly constituted compensator suspension 2 is attached to the base 3 by means of pillar 9 serving to anchor one end of flexure plates 10a and 10b which are clamped apart at their other ends by stem 11. Stems 6 and 11 are arranged to execute essentially parallel displacements perpendicular to the base 3 and essentially parallel to columns 4 and 9. These suspensions would be independent except for the inter-coupling through dashpot 12 which provides a force proportional to the relative velocity between stem 6 and stem 11. Displacements of the two stems thus intercoupled, may be measured independently by displacement transducers T–1 and shaft 6 and T–2 of shaft 11. The outputs of these transducers may be either added or subtracted, depending upon the compensation desired.

The situation where the dispacement signals are to be subtracted is illustrated in FIG. 1. This connection would be desired if a compensation for the impact of a hard object was to be attained as well as for cancelling the vibration signals. In general the vibrations inherent in motor noise applied to the base will be of a relative high frequency compared to the natural frequency of the suspensions. As such, the suspension will undergo motion relative to the base in phase with one another. The signals generated by their respective relative displacements would tend to cancel in the subtracted output of the displacement transducers.

If hard solid objects are dropped on the pan, the momentum of the impact is seen as imparting appreciable initial velocity to the pan 7. This may cause the displacement of scale stem 6 to over-shoot. However, with the present invention, the rate proportional coupling will produce a corresponding positive signal or displacement to the compensating suspension (e.g. of stem 11 in proportion to the downward velocity of the stem 6). Subtraction of the velocity proportion signal of stem 11 will tend to compensate for the over-shoot of stem 6, as will hereinafter be made clear. Vibrations on the pan 7, however, will be transmitted directly to the compensating suspension so that these like the base vibrations will tend to cancel in the subtracted displacement transducer signals. The dashpot 12 may be adjusted so that movements of the scale pan 7 caused by normal feed rates will not create any substantial signal in the compensating system. In this mode of operation compensation will be provided for both vibration and impact loading.

There is alternately a second mode of operation in which the displacements of stems 6 and 11 would be connected so as to be additive rather than subtractive. Such positive corrective signal would be employed if it were necessary to compensate the scale for the weight of a powder or fluid still in the air and past the cutoff valve at the time the given weight is indicated. Correct compensation is possible here because the more rapidly the receptacle is being filled, the greater the rate of proportional displacement of the compensating suspension, corresponding to greater mass of material between the cutoff valve and the receptacle. In this embodiment the dashpot is adjusted so that a substantial signal is produced in the compensating system for normal feed rates, this signal being proportional to the rate at which material is being fed to the scale means. Actual examples of the compensating action will be given later in connection with a practical embodiment of my invention.

Figure 3:
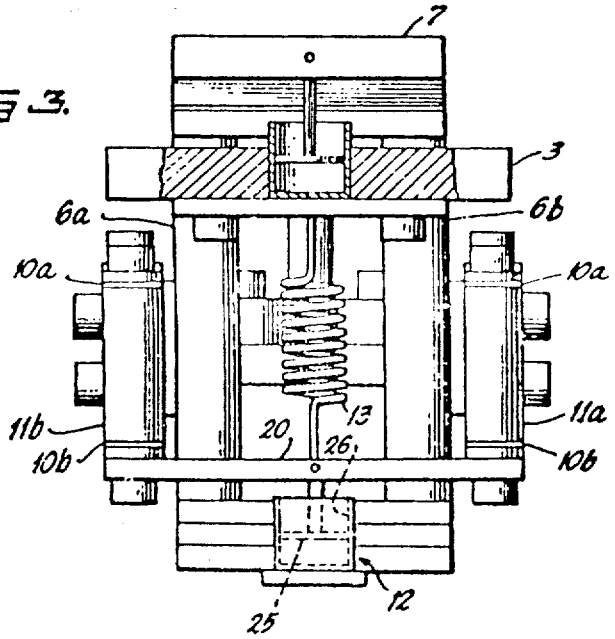
FIG. 3 shows an end view of the structure of FIG. 2 partially cut away to reveal the scale pan damper and also providing an unobstructed view of the auxiliary weight-deflected linear spring.
Figure 4:
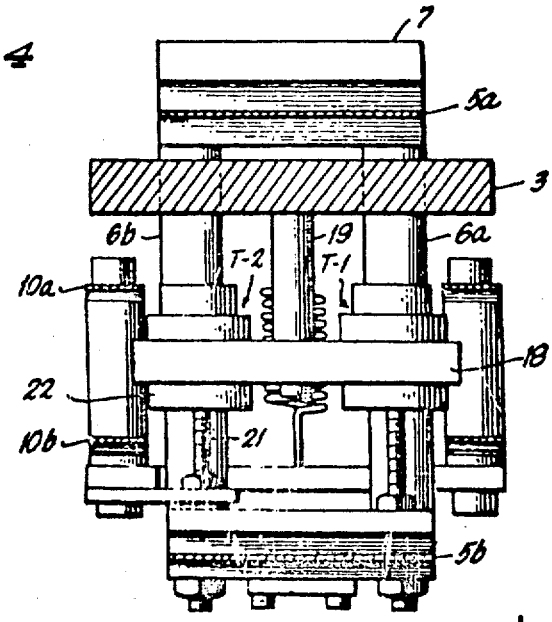
FIG. 4 shows a view taken along the section designated as 4—4 in FIG. 2.

In FIGS. 2, 3 and 4, a model of an operative form of the scale system in accordance with the teaching of my invention is shown in detail. Here the base 3 supports both the scale suspension 1 and the compensating suspension 2 from a single column 4 located at the right hand end of the figure shown. In the preferred embodiment the post member 4 is rectangular in cross-section, being of substantial breadth so as to give support to rather wide flexure plates 5a and 5b. The width of these flexure plates provides high lateral stiffness of the scale suspension so that very little lateral displacement will result from corresponding forces applied to the pan 7. The lateral extremities of flexure plates 5a and 5b are connected by double columns 6a and 6b serving to constrain the flexure plates to parallel configuration and to space the ends equi-distant to the spacing imposed on post 4. In the configuration shown here, the flexure plates 5a and 5b lie on opposite sides of the base plate 3 and accordingly must be interconnected by extending the posts 6a and 6b through the base in the holes provided therefor. The displacement of stem 6 relative to the base 3 is indicated by the output of displacement transducer T–1. Here a bracket 15 attached to stems 6 provides mounting for a core member 16 of the differential transformer with body coils shown at 17. The body coils on the other hand are mounted to the base frame by means of brackets 18 and 19.

A fixed base support for the compensating suspension 2, corresponding to post 9 of FIG. 1, is provided by boss members 9 fixed to column 4. Clamped by members 9, flexure plates 10a and 10b are bifurcated so as to straddle the necessary lateral extremities of posts 4 and 6. These are connected at the outer movable extremity by double post members 11a and 11b attached to the single base plate 20. Vertical displacements of the base 20 are sensed by displacement transducer T-2 shown here as a differential transformer having core member 21, a coil body 22 which is suspended from the base plate 3 by means of post 19 and bracket 18. As in the case of the scale suspension, the compensating suspension also provides excellent lateral and longitudinal stiffness with high compliance only in the vertical displacement direction.

The coupling between suspensions 1 and 2 is provided by a dashpot shown generally by reference character 12 and comprising a piston 25 immersed in a viscous fluid contained in cylinder 26 which in turn is attached to the column 6 by means of the bracket 27.

In practical scales it also may be desirable to provide damping on the scale pan suspension itself. In FIGS. 2, 3 and 4 this is provided by dashpot 28 consisting essentially of piston 30, connected to the scale pan by means of stem 29, and a cylinder 31 attached to the base 3. The viscous fluid contained in cylinder 31 is forced around the piston upon its excursions in and out of the fluid, thus providing a resistance proportional to the time rate of displacement of the piston relative to the cylinder.

In the practical embodiment of the invention, the resilient flexures 5 and 10 are made from heat-treated beryllium copper; an alloy containing about 2.5% beryllium has been found satisfactory. Other moving parts of the suspension can advantageously be constructed of a light structural metal, such as an alloy of aluminum, and the weight of the scale as a whole can be minimized by the construction of most of the essential parts of such a light alloy. As to the damping fluid used in the dashpots, the liquid methylsiloxane has been found satisfactory in the practical embodiment. In a typical case the compensator suspension would have a natural frequency of one tenth of a second and the plunger diameter and fluid viscosity of dashpot 12 would be selected to produce critical damping of the compensator suspension when the scale position is held clamped. As to the scale suspension itself the viscosity and plunger diameter of dashpot 28 would be chosen to provide critical damping, but here part of the damping would come from the compensator dashpot which also provides resistance to scale movement through the interconnection. It will be understood, of course, that various combinations of natural frequencies and damping constants can be used to favor certain frequencies or certain compensation requirements. The foregoing characteristics are cited only by way of illustration and should not be construed to limit the scope of my invention to the specific characteristics described by way of illustration.

It has been noted in the foregoing discussion that the vertical displacements of the scale and compensating members is detected by linear differential transformers. These displacement transducers are quite conventional and do not require a detailed discussion here. Briefly, in each transformer primary windings 35 and 36 are fixed in the center of the coil member and two secondary windings 37, 38, 39, and 40, respectively, are disposed symmetrically either side of it. When the primary is energized and the cores 45 and 46 are precisely centered with respect to the two secondaries, equal voltages are induced in each winding. The two secondaries are connected in a bridge and the voltage is cancelled. When a core is moved above or below this position, the secondary voltages are unequal and no longer cancelled. This results in an output signal appearing across potentiometer 41 for the scale signal, or voltage divider 42 for the compensator, with phase reversing on either side of the null. The signals from either of the two sets of differential transformers may be connected so as to add or subtract according to the compensation desired. In FIG. 5 the output at 44 represents the difference or subtractive connection. When used in the rate or additive connection for compensating for material in the air, the resistance values in the voltage divider 42 can be fixed to provide the proper amount of rate signal for a given feeder or column height or the voltage divider can be replaced with a potentiometer to permit adjustment of the amount of rate signal. The use of differential transformers as displacement transducers is by way of illustration of a practical embodiment of this invention. However, other types of displacement transducers could be used without departing from the scope of my invention.

For a more complete understanding of the operation of my improved weighing device, it is helpful to consider its mechanics as a system of coupled, damped, harmonic oscillators. The natural frequency of the scale suspension is determined from design considerations including the load to be carried and the deflection desired for maximum accuracy and sensitivity. Whatever this frequency must be, however, the compensator suspension is usually designed to have a natural frequency substantially higher than the natural frequency of the scale suspension. Usually this is higher by factor two. This is done to provide stiffer coupling between the two suspensions and to reduce the settling time. For a compensator suspension of given mass, the dashpot resistance needed for critical damping is greater if the natural frequency is higher. This improves tracking between the two suspensions under conditions of pan vibration and impulsive loading. It also shortens the recovery or settling time because less time is needed for the compensator to reach its equilibrium condition if its natural frequency is higher. Unlike the scale suspension, however, the compensator need carry no load, or object being weighed, so it may be much lighter suspension. In view of its lower mass its coupling to the scale suspension tends to have very little effect on the natural characteristics of the scale suspension. Accordingly, the force applied to the compensating suspension may be considered as simply proportional to the velocity of the primary or weighing scale suspension.

Just how effective this type of compensation can be is illustrated by the actual records made with a practical model of my invention illustrated in FIGS. 6 through 9. In FIG. 6 the vibration is introduced through the base by means of a motor attached thereto with an eccentric on its shaft. The drawing shows graphically the deflection of the scale and the compensator both reflecting the vibration. Since these signals are connected to subtract to reduce each other, the resultant trace is evidence of the degree of cancellation of the vibration signals.

The curves of FIG. 7 show the effect of impact of a hard object on the scale pan or impulsive loading. This condition will be encountered when hard candy, cookies, potato chips, caramels, etc. are being weighed and dropped from some distance. In this particular instance, a 5 gram weight was dropped on the scale shown in FIGS. 2–4 from a distance of about 1½ inches. The scale trace shows the signal from the scale suspension transducer, which would normally be obtained without compensation. The overshoot due to impact is about 13 millimeters. When the compensator signal is combined with the scale signal the resultant is an overshoot of about 4 millimeters. This compensation could be further increased by increasing the frictional coupling in the coupling dashpot, so as to reduce the overshoot to zero. It should be noted that it requires only about a fifth of a second for the scale to reach its equilibrium position after the impulsive loading. Where no compensation is provided, but damping made sufficient to avoid overshoot, the time required to reach equilibrium would naturally be much greater than this, as it is a time only the order of the period of the primary or weighing suspension. This compensation system thus permits a substantial increase in the weighing speed of my scale.

It is important to note here that my invention permits an alternative mode of operation in which compensation can be made for variations of the weight of powder or liquid in the air at the time the filling valve is closed. The errors which normally result in the conventional scale with change in load and filling rate are seen in FIG. 8, where the upper figure shows that at a slow rate of loading the final weight varies little in excess of the cut off level obtained. However, in rapid filling on the same scale, the weight of material in the air at the time of cut off will naturally be much greater so that the final weight will be considerably in excess of the cut off level, or the level obtained when the filling rate is slow, as represented by the lower trace.

To employ my invention to properly compensate for the weight of the column in the air, the displacement signals from the differential transformers T–1 and T–2 are arranged to be additive rather than subtractive. The rate of filling will be assumed relatively slow compared to the natural frequency of either suspension so that the compensator velocity proportional signal is simply proportional to the rate of filling. The rate of change of weight is proportional to the weight of material in the air, therefore, the signal from the compensator could be considered to be weighing the material in the air or be proportional to this amount. Because the two voltages are connected to add, the compensating signal causes the resulting signal to reach the cut off value signal sooner at higher rates of feed, as shown in solid line in FIG. 9. *Thus the filling or cut-off valve is actuated, i.e., cut off, when the resulting signal reaches the predetermined cut off value or trip level. The dashed line portion of FIG. 1 illustrates in block form the remaining elements of the overall system for the operational mode described above, the combined outputs of the transformers T–1 and T–2 being shown as being connected to a block labeled Cut Off Valve And Actuator which is indicated to control the material supply, the cut off valve, as stated, being actuated when the combined rate and load signal reaches the trip level.* The dash lines on the curve show the reduced compensation effected and required at the lower feed rates.

The effects of the damping applied in the preferred embodiment through dashpot 28 on the response of the primary or scale system will be evident from an inspection of FIG. 7. It should be noted in addition that this damping is desirable because it prevents the excessive excursions of the primary weighing system during oscillation. These oscillations could be great enough to exceed the linear range of the differential transformers and thus adversely affect the accuracy of the scale indication. The damping also tends to reduce oscillations induced when adding weights suddenly or those induced by vibrations. This is usually helpful because there can be small relative motion between the two members during oscillation which causes imperfect cancellations.

The foregoing description has been purposely specific to a preferred embodiment of my invention, particularly to dashpot coupled spring suspensions. However, with this specific example by way of illustration, it will be appreciated that by basic concept and teaching is of general applicability to the art of automatic weight sensing. In general, it is a basic teaching of my invention that it is possible to anticipate the material that will continue to be added to the scale after the cut off signal by detecting the rate of change of weight; that this rate sensing can be done in a very simple manner by coupling one force sensitive system to another by a dashpot; that the force sensitive systems need not be limited to spring suspensions but may include the gravity actuated beam balance as well as the beam balance with stiffness augmented by resilient members. Likewise various displacement detecting systems may be employed, such as photoelectric transducers. Alternatively, other types of rate proportional intercoupling may also be employed.

For particular examples of such systems, consider the beam balance shown in FIG. 10 where pan stems 50 and 51 are suspended on opposite sides of supporting post 52 by arms 53 and 54. Restoring force can be built into the system by placing the fulcrums 55 and 56 in the fixed post 52 a predetermined distance above a line connecting stem fulcrums 57 and 58 or 59 and 60, respectively. This may be augmented or substituted by spring members 61 and 62 connected between base 63 and opposite regions of lower cross arm 54. The selection of spring compliance will permit convenient adjustment of the sensitivity and natural frequency of the primary balance suspension.

The secondary or compensating suspension is likewise a beam suspension, wherein stem member 64 is attached to post 52 by parallel connecting arms 65 and 66. A counterweight 68 provides gravitational neutrality and spring 67 augments whatever gravitational restoring force may be inherent in this suspension as required for a proper frequency relationship between primary and compensating suspensions. The velocity sensitive coupling between suspensions is provided here by fluid dashpot 68. The primary suspension is damped by dashpot 69 connected between the primary suspension and the base 63. With the foregoing description, it should be apparent to one skilled in this art that the dynamic response of this system may be made quite equivalent to that for the flexure plate suspensions previously described.

For the measurement of the displacement responses of primary and secondary suspensions, a novel photoelectric-optical system is shown in connection with the balance structure. In FIG. 10 it is arranged to subtract the relative displacements, and thus to compensate for impact and vibration. Here a light source 70 and condensing lens 71 fills the aperture of lens 72. A shutter 73 connected to stem 50 is focused at screen 74 by lens 72. If unobstructed the light from lens 72 projects upon photocell 75. A fixed mask 74 prevents light below the optical axis of the system from falling upon the photocell 75. Thus, in the neutral position no light is transmitted to detecting photocell 75. Downward motion of shutter 73 causes upward movement of the image above mask 74 allowing light to strike the photocell. Downward motion of lens 72 causes downward motion of the image. Therefore, substantially equal movements of primary and compensating suspensions will cause opposite movements of the image relative to mask 74, thereby causing cancellation in a manner similar to that shown in the flexure suspension embodiment.

The structure, for the sake of simplification, shows a means of obtaining a large change in the photo-electric cell output signal when a given weight level is reached. This could be used to cut off a feeder when a desired weight indication is reached. Two or more photocells and masks could be used if additional weight levels were to be sensed. It is also possible to achieve a signal level proportional to weight by the use of V-shaped mask or shutters as is well known in the art.

FIG. 11 shows a balance structure similar to that of FIG. 10 except that a magnetic type velocity sensitive coupling 76 replaces the dashpot 68. Of particular note is the photoelectric displacement sensor which has been devised to add displacements, thereby providing an anticipatory signal proportional to the velocity of the primary suspension. An additional stationary lens 77 is added for the purpose of inverting the image or shutter 73. A mask 78 has accordingly been provided on the upper side of the optical axis. Downward motion of stem 50 causes the image at 78 to move downward. Downward motion of lens 72 also moves the image downward, allowing more light to reach the photocell. As the displacement of lens 72 is proportional to the velocity of the primary suspension and stem 50 and as the movement of either suspension causes a shift in the image in the same direction, the two motions are additive and the desired anticipatory compensation results.

The magnetic coupling 76 which here replaces the fluid coupling of previously described embodiments, consists essentially of a magnet 79 attached to stem 50 and an aluminum vane 80 attached to stem 64 so as to pass between the poles of the magnet. Relative motion of the magnet sets up eddy currents in the vane, the energetics of which result in a force proportional to the relative velocity.

What I claim is:

[1. A weighing system comprising a weighing pan, means responsive to a load applied to said pan for producing a first signal proportional to the applied load, and means coupled to said first named means for producing a second signal proportional to the rate of change of said first signal.]

[2. A weighing system for weighing increasing applied load and for anticipating future load comprising means for weighing the instantaneous applied load and for producing a measured applied load signal, means for determining the rate at which the load is being increased and for producing an incremental rate signal, and means for predicting the future load based on the rate at which the previously applied load is increasing by adding the incremental rate signal to the measured applied load signal.]

3. A weighing system comprising a first scale, first transducer means for transmitting a signal proportional to the load applied to said scale, a compensator *including a suspension coupled to said scale*, second transducer means [for transmitting a signal proportional to the movement of said compensator], rate sensitive means *for producing a second signal proportional to the rate of movement of the scale* for connecting said scale and compensator whereby said second transducer means produces *said* [a] signal proportional to the rate of movement of said scale and means connecting said first and second signals.

4. A weighing system for weighing applied load and for compensating for external vibration and impact loading comprising means for weighing the applied load on a scale to produce a first signal having components of load and vibration, a compensator coupling the scale to the compensator, means to transmit movement to the compensator in response to vibration of the scale and instantaneously applied impact load causing movement of the scale to produce a second signal from the compensator with components of vibration and impact loading of said scale and means coupling the first and second signals to reduce the extraneous effects of the determination of the weight of the applied load caused by vibration and impact load.

5. A weighing system for weighing normally applied loads and for compensating for impact loading and external vibration comprising a weighing pan, first means operatively connected with said pan for producing a first signal proportional to the applied load and to external vibration, second means for producing a second signal *proportional to the rate of change of applied load* and means coupling said first and second means, said coupling means transmitting a signal from the first means to said second means proportional to the rate of change of said first signal whereby said second means produces a signal of vibration and impact loading of the weighing pan, and means connecting said first and second signals to reduce the extraneous effects on the determination of the weight of the applied load caused by vibration and impact loading.

6. A balance comprising (a) a base member providing a reference frame for the structure, (b) a primary suspension attached to said base, (c) a primary displacement element constrained by said primary suspension to essentially rectilinear displacements proportional to an applied load, (d) a secondary suspension attached to said base, (e) a secondary displacement element constrained by said secondary suspension to essentially rectilinear direction essentially parallel the displacement direction of said primary element, (f) a velocity sensitive force transmitting element coupling said primary displacement element to said secondary displacement element *so as to compensate for the effects of impact and vibration loading*, and (g) means operatively associated with said primary and secondary displacement elements for measuring the displacements of said elements.

7. A balance as in claim 6 [but] *and* including a dash pot coupling said primary displacement elements to said base.

8. A balance as in claim 6 [but] *and* in which the natural frequency of undamped oscillation of said secondary suspension is substantially different from that of said primary suspension.

9. A balance as in claim 6 [but] *and* in which the natural frequency of undamped oscillation of said secondary suspension is approximately twice that of said primary suspension.

10. A balance as in claim 6 [but] *and* in which said primary velocity-sensitive force-transmitting element provides approximately critical damping of said secondary suspension when said primary displacement element is held fixed with respect to said base.

11. A *weighing apparatus* [system for compensating weight indicia for effects of impact and vibration] comprising (a) a primary weighing system having an element deflectable in direct proportion to applied load, (b) a secondary weighing system having an element deflectable in direct proportion to applied load, (c) a velocity-sensitive force-coupling connected between said primary and said secondary deflectable elements *so as to compensate for the effects of impact and vibration loading*, and (d) means to measure the difference of the deflections of said primary and said secondary deflectable elements.

12. A system as in claim 11 but wherein said deflection measuring means includes (a) a primary mask mounted on said primary deflectable element, (b) means for illuminating said mask, (c) a lens mounted on said secondary deflectable element focusing an image of said mask, (d) a fixed photoelectric detector receptive of the illuminated image of said mask, and (e) a secondary mask mounted so as to intercept the image of said primary mask whereby light is transmitted to the photocell when the deflection of said primary mask exceeds a fixed level less an amount proportional to the deflection of said secondary deflectable element.

13. A system for compensating weight indicia for material still in process of entry at the time a cut-off threshold is reached comprising (a) a primary weighing system having an element deflectable in direct proportion to applied load, (b) a secondary weighing system having an element deflectable in direct proportion to applied load, (c) a velocity-sensitive, force-coupling connected between said primary and said secondary deflectable elements *so as to compensate for material still in the process of entry at the time a cut-off threshold is reached*, and (d) means to measure the sum of the deflection of said primary and said secondary deflectable elements.

14. A system as in claim 13 [but] *and* wherein said deflection measuring means includes (a) a primary mask mounted on said primary deflectable element, (b) means for illuminating said mask, (c) a fixed lens focusing an image of said mask, (d) a lens mounted on said secondary deflectable ele-

EST AVAILABLE COPY (e) a fixed photoelectric detector receptive of the illuminated image of said mask, and (f) a secondary mask mounted so as to intercept the image of said primary mask whereby light is transmitted to the photocell when the deflection of said primary mask exceeds a fixed level plus an amount proportional to the deflection of said secondary deflectable element.

15. A system as in claim 13 but wherein said velocity-sensitive, force-coupling consists of a magnet mounted on one deflectable element and a conductive vane mounted on the other deflectable element so as to pass between the poles of the magnet upon relative deflection of the two elements.

16. A weighing system comprising, in combination, a base, a primary suspension including at least one resilient flexure plate attached to the base, first means for measuring deflection of said primary suspension, a secondary suspension including at least one flexure plate attached to the base, second means for measuring deflection of said secondary suspension, a [rate] *velocity* sensitive coupling interconnecting said primary and secondary suspensions *so as to compensate for the effects of impact and vibration loading*, said [rate] *velocity* sensitive coupling comprising a dashpot having a cylinder and piston, the piston being coupled to one of said suspensions and the cylinder being coupled to the other of said suspensions, and means connecting said first and said second measuring means.

17. A weighing system comprising, in combination, a supporting frame, a first scale including flexure plates attached to said frame, a second scale including flexure plates attached to said frame, a [rate] *velocity* sensitive coupling interconnecting said first and second scales *for compensating for the effects of impact and vibration loading*, said [rate] *velocity* sensitive coupling including a dashpot having a piston and fluid filled cylinder, the cylinder being coupled to one of said scales and the piston being coupled to the other of said scales and means for measuring the difference in deflection of said first and second scales.

18. A weighing system comprising a supporting frame, a first pair of flexure plates having one end secured to said supporting frame, a scale pan supported by the other end of said flexure plates, a second pair of flexure plates having one end secured to said supporting frame, a rate sensitive coupling interconnecting the other end of said second pair of flexure plates with said first pair of flexure plates and electrical means for measuring the deflection of said first and second pair of flexure plates and for producing an output signal directly proportional to the applied load on said scale pan and reducing the extraneous effects on the determination of weight caused by vibration and impact load.

19. A weighing system according to claim 18 wherein said electrical means includes a linear differential transformer.

20. A weighing system comprising, a base, a primary suspension system including a pair of flexure plates having one end secured to said base, a weighing pan supported by the other end of said flexure plates, a dashpot connected between the primary suspension system and the base, a secondary suspension system, said secondary suspension system including a pair of flexure plates having one end thereof secured to the base, the other end of the second pair of flexure plates being interconnected, a rate sensitive coupling including a piston and fluid filled cylinder interconnecting the primary and secondary suspension systems, the piston being connected to that end of one pair of flexure plates remote from the base and the cylinder being connected to the end of the other pair of flexure plates remote from the base, first transducer means for producing and transmitting a signal proportional to the load applied to the weighing pan and vibration and impact loading, second transducer means for producing and transmitting a signal proportional to the movement of the secondary suspension system due to vibration and impact loading and electrical circuit means interconnecting said first and second transducer means whereby the signal from said second transducer means is substracted from the signal from the first transducer means so that the output signal is proportional to the actual load applied to the weighing pan so as to reduce extraneous effects caused by vibration and impact loading.

21. A weighing system according to claim 20 and further including a first dashpot connected between the primary suspension system and the base and a second dashpot connected between the secondary suspension system and the base.

[22. A weighing system comprising a scale, a compensator, velocity sensitive force transmitting means coupling said scale to said compensator, and means for determining the relative displacement between said scale and said compensater.]

*23. A weighing system comprising a scale, a compensator for compensating for the effects of impact and vibration loading, velocity sensitive force transmitting means coupling said scale to said compensator, and means for determining the displacement between said scale and said compensator so as to compensate for the effects of impact and vibration loading.*

*24. A weighing system for weighing increasing applied load in a material filling process comprising a scale, a compensator for compensating for the material that will continue to be added to the scale after a cut off signal to the material filling process, velocity sensitive force transmitting means coupling said scale to said compensator, and means for determining the displacement of said scale and said compensator so as to compensate for the material that will continue to be added after said cut off signal to the filling process based on the rate at which the previously applied load is increasing.*

*25. A weighing system for weighing increasing applied load in a material filling process wherein material is fed from a product supply to a scale and for obtaining a predetermined final load weight, comprising means for weighing the instantaneous applied load and for producing a measured applied load signal, means for determining the rate at which the load is being increased and for producing a rate signal, means for adjusting the rate signal to be substantially representative of the weight of the material that will continue to be added to the scale after a cut off signal to the filling process is produced, means for combining the adjusted rate signal and the measured applied load signal, and means for producing said cut off signal for cutting off the filling process when the weight represented by the combined signals is substantially equal to the predetermined final load weight so as to compensate for the weight of the material that will be added to the scale after the cut off signal cuts off the filling process and thereby obtain said predetermined final load weight.*

*26. A weighing system for weighing increasing applied load in a material filling process wherein material is fed from a product supply to a scale and for producing a predetermined final load weight, comprising means for weighing the instantaneous applied load and for producing a measured applied load signal, means for determining the rate at which the load is being increased and for producing a rate signal, and means for adding the rate signal to the measured applied load signal to produce a cut off signal for cutting off the filling process which compensates for the material that will continue to be added to the scale after the cut off signal to the filling process based on the rate at which the previously applied load is increasing thereby producing said predetermined final load weight.*

*27. A system as claimed in claim 26 wherein cut off is provided by a cut off valve when the cut off signal reaches a predetermined value corresponding to said predetermined final load weight and the material is weighed in a*

*scale pan and is gravity fed to the scale pan at a substantially constant rate.*

*28. A system as claimed in claim 27 wherein said rate-determining means comprises a mechanical dashpot.*

*29. A system as claimed in claim 27 wherein said rate-determining means comprises a mechanical dashpot.*

References Cited

The following references, cited by the Examiner, are of record in the patented file of this patent or the original patent.

UNITED STATES PATENTS

| | | | |
|---|---|---|---|
| 2,767,975 | 10/1956 | Horst et al. | 177—200 |
| 2,793,026 | 3/1957 | Giardino et al. | 177—185 |
| 2,829,856 | 4/1958 | Gregory | 177—122 |
| 2,969,228 | 1/1961 | Appius | 177—229 |
| 3,080,936 | 3/1963 | Sher et al. | 177—229 X |
| 3,107,743 | 10/1963 | Knobel | 177—210 X |
| 3,133,606 | 5/1964 | Thomson | 177—210 |
| 3,137,358 | 6/1964 | Jungmayer | 177—210 X |
| 3,148,742 | 9/1964 | Giulie | 177—229 X |
| 3,172,493 | 3/1965 | Koch et al. | 177—210 |

RICHARD B. WILKINSON, Primary Examiner

V. W. MISKA, Assistant Examiner

U.S. Cl. X.R.

177—184, 210